United States Patent
Hirao

(10) Patent No.: US 10,976,264 B2
(45) Date of Patent: Apr. 13, 2021

(54) ANALYSIS SYSTEM

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Shun Hirao, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/564,078

(22) Filed: Sep. 9, 2019

(65) Prior Publication Data
US 2020/0292469 A1 Sep. 17, 2020

(30) Foreign Application Priority Data
Mar. 15, 2019 (JP) ................. 2019-048395

(51) Int. Cl.
*G03F 7/20* (2006.01)
*G01N 21/95* (2006.01)
(Continued)

(52) U.S. Cl.
CPC ... *G01N 21/9505* (2013.01); *G01N 21/95607* (2013.01); *G06T 7/0004* (2013.01); *G06T 2207/30148* (2013.01)

(58) Field of Classification Search
CPC ............ G01N 21/9501; G01N 21/956; G01N 21/8803; G01N 21/95623; G01N 2021/8854; G01N 21/958; G01N 2021/8822; G01N 2021/8835; G01N 21/88; G01N 2021/177; G01N 2021/646;
(Continued)

(56) References Cited

U.S. PATENT DOCUMENTS 7,283,659 B1 * 10/2007 Bakker ................ G06K 9/6254
382/144
7,508,973 B2 3/2009 Okabe et al.
(Continued)

FOREIGN PATENT DOCUMENTS

| JP | 2004-294358 A | 10/2004 |
| JP | 2011-89976 A | 5/2011 |
| JP | 2016-212008 A | 12/2016 |

OTHER PUBLICATIONS

Nakata et al., "A Comprehensive Big-Data-Based Monitoring System for Yield Enhancement in Semiconductor Manufacturing," IEEE Transactions on Semiconductor Manufacturing, 30:339-344 (Nov. 2017).

*Primary Examiner* — Mesfin T Asfaw
(74) *Attorney, Agent, or Firm* — Finnegan, Henderson, Farabow, Garrett & Dunner L.L.P.

(57) ABSTRACT

According to one embodiment, an analysis system includes a display controller. The display controller is configured to display a first comprehensive image and a first individual image from a plurality of workpiece data. The plurality of workpiece data relate to a plurality of workpieces, are classified into a plurality of categories, and are classified into one of a plurality of classes. The first comprehensive image is based on the plurality of workpiece data. The first individual image is based on a part of the plurality of workpiece data classified into one of the plurality of categories.

12 Claims, 6 Drawing Sheets

(51) Int. Cl.
*G06T 7/00* (2017.01)
*G01N 21/956* (2006.01)

(58) Field of Classification Search
CPC ...... G01N 2021/8887; G05B 19/41875; G05B 19/418; G05B 19/40938; G05B 19/4183; G05B 19/402; G05B 19/401; B23K 26/03; B23K 26/032; G06T 7/0004; G06T 7/0006; G06T 7/001; G06T 7/0002; G06F 3/0486; G06F 16/58; H01L 21/67253; H01L 21/76879; G03F 7/7065; G06K 9/6223; G06K 9/033; G01B 11/028; H04N 5/235; H04N 5/23216; B26D 5/007; B25J 9/1697; B25J 9/1661; G16H 10/60; Y02P 90/30; B07C 7/005
See application file for complete search history.

(56) References Cited

U.S. PATENT DOCUMENTS

| | | | |
|---|---|---|---|
| 9,075,026 B2 | 7/2015 | Urano et al. | |
| 2011/0211060 A1* | 9/2011 | Funakoshi | G03F 1/84 |
| | | | 348/80 |
| 2018/0143144 A1 | 5/2018 | Mori et al. | |

* cited by examiner

FIG. 3A
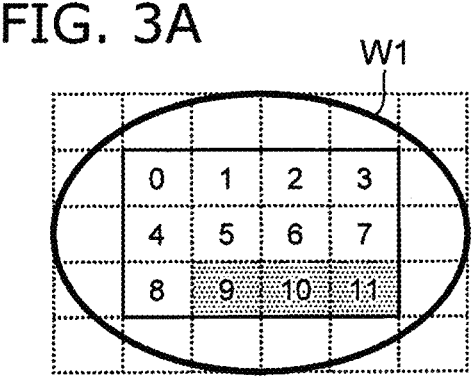
FIG. 3B
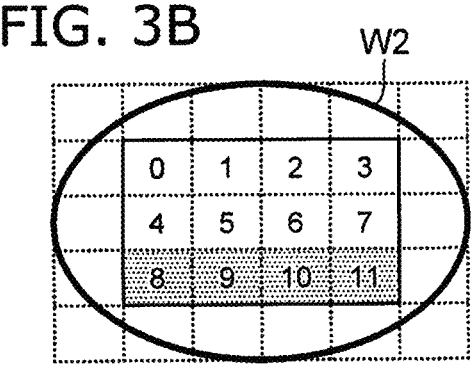
FIG. 3C
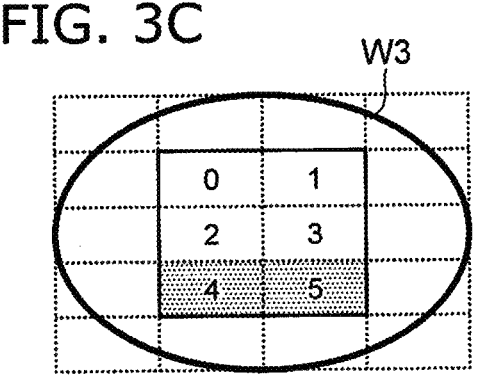
FIG. 3D
[0,0,0,0,0,0,0,0,0,1,1,1]
FIG. 3E
[0,0,0,0,0,0,0,0,1,1,1,1]
FIG. 3F
[0,0,0,0,1,1]

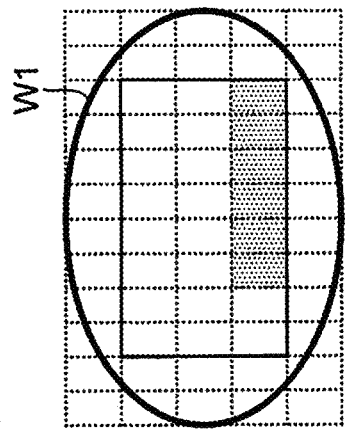
FIG. 4A
FIG. 4B
FIG. 4C
[0,0,0,0,0,0,0,
0,0,0,0,0,0,0,
0,0,1,1,1,1,1,1]
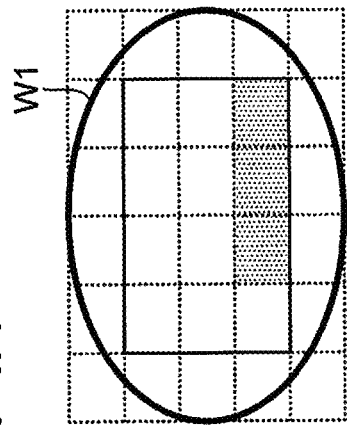
FIG. 4D
FIG. 4E
(e)
FIG. 4F
[0,0,0,0,0,0,0,
0,0,0,0,0,0,0,
0,1,1,1,1,1,1,0]
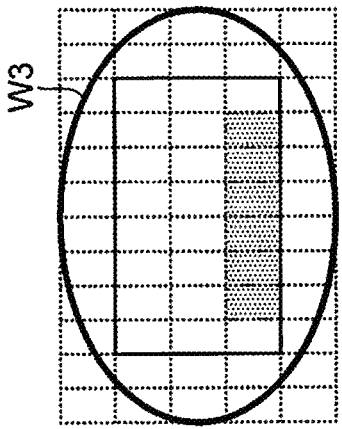
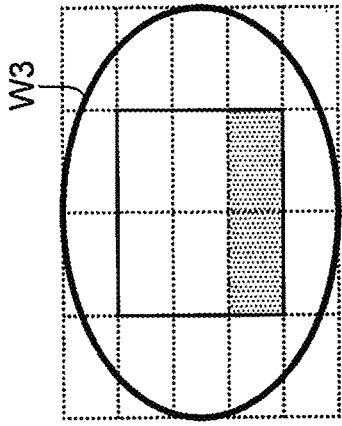

| CLASS | COMPREHENSIVE IMAGE | PRODUCT TYPE A | PRODUCT TYPE B | PRODUCT TYPE C | PRODUCT TYPE D |
|---|---|---|---|---|---|
| 1 | | | | | |
| 2 | | | | | |
| : | | | | | |
| N-1 | | | | | |
| N | | | | | |

FIG. 6

ANALYSIS SYSTEM

CROSS-REFERENCE TO RELATED APPLICATIONS

This application is based upon and claims the benefit of priority from Japanese Patent Application No. 2019-048395, filed on Mar. 15, 2019; the entire contents of which are incorporated herein by reference.

FIELD

Embodiments described herein relate generally to an analysis system.

BACKGROUND

There is an analysis system that classifies workpieces into one of multiple classes for each category. By referring to the classified results, the user can shorten the time necessary to investigate the workpieces. To further shorten the time necessary for the investigation of the user in the analysis system, it is desirable to develop technology so that information that is more beneficial to the user can be provided.

BRIEF DESCRIPTION OF THE DRAWINGS

FIG. 3A to FIG. 3F, FIG. 4A to FIG. 4F, and FIG. 5 are schematic views illustrating the processing of the analysis system according to the embodiment; and FIG. 6 shows a display example of the analysis system according to the embodiment.

DETAILED DESCRIPTION

Figure 1:
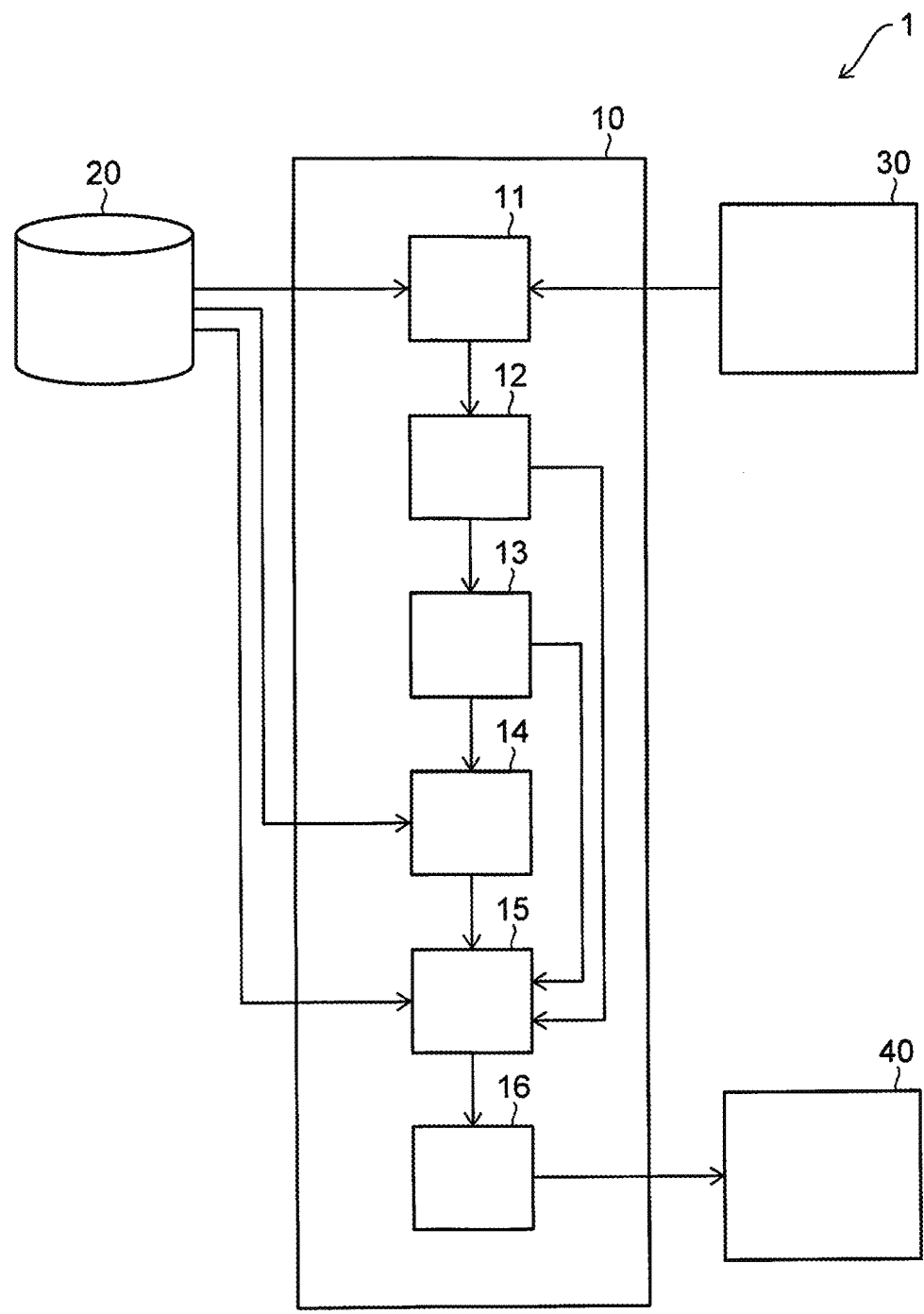
FIG. 1 is a schematic view illustrating an analysis system according to an embodiment.

According to one embodiment, an analysis system includes a display controller. The display controller is configured to display a first comprehensive image and a first individual image from a plurality of workpiece data. The plurality of workpiece data relate to a plurality of workpieces, are classified into a plurality of categories, and are classified into one of a plurality of classes. The first comprehensive image is based on the plurality of workpiece data. The first individual image is based on a part of the plurality of workpiece data classified into one of the plurality of categories.

Various embodiments are described below with reference to the accompanying drawings.

In the specification and drawings, components similar to those described previously or illustrated in an antecedent drawing are marked with like reference numerals, and a detailed description is omitted as appropriate.

FIG. 1 is a schematic view illustrating an analysis system according to an embodiment.

Figure 2:
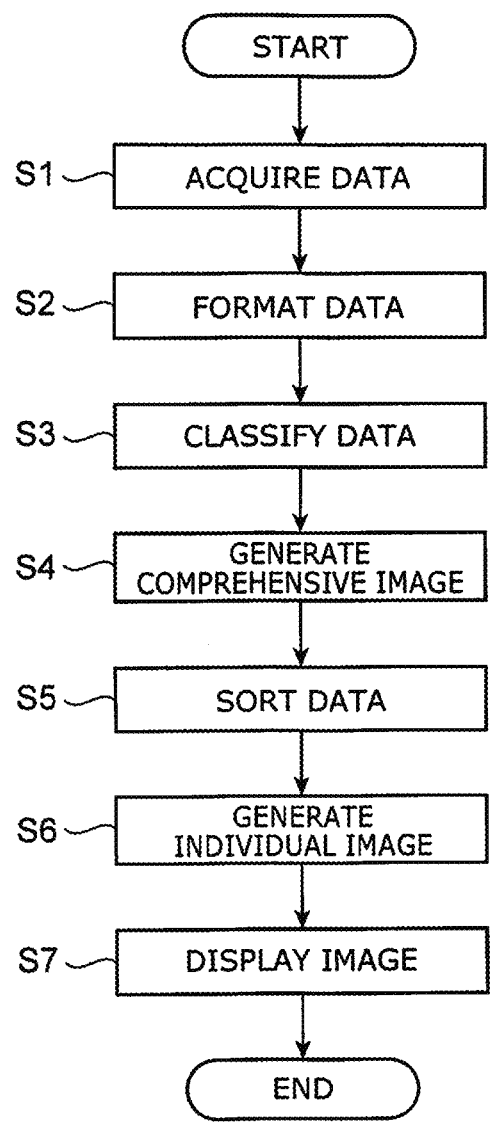
FIG. 2 is a flowchart illustrating the processing of the analysis system according to the embodiment.

FIG. 2 is a flowchart illustrating the processing of the analysis system according to the embodiment.

As shown in FIG. 1, the analysis system 1 according to the embodiment includes a display controller 10. In the example shown in FIG. 1, the analysis system 1 further includes a memory device 20, an input device 30, and a display device 40.

The memory device 20 stores a database. The database stores multiple workpiece data. The data of each workpiece includes the workpiece number, the category of the workpiece, information relating to the workpiece, etc.

The display controller 10 refers to the database of the memory device 20 and acquires the multiple workpiece data (step S1). For example, the user uses the input device 30 to specify the workpiece data to be acquired. The display controller 10 formats the workpiece data so that the data of each workpiece can be classified equivalently (step S2). Based on the information included in the workpiece data, the display controller 10 classifies the formatted data of each workpiece into one of multiple classes (step S3).

Based on the workpiece data classified into the classes, the display controller 10 generates a comprehensive image representing each class (step S4). Also, the display controller 10 sorts the workpiece data classified into each class into each category (step S5). By using the sorted workpiece data, the display controller 10 generates an individual image for each set of class and category (step S6).

The display controller 10 causes the display device 40 to display the generated comprehensive images and the generated individual images (step S7). For example, the user can analyze the workpieces while referring to the multiple comprehensive images and the multiple individual images.

For example, by comparing the comprehensive image based on the workpiece data classified into one class and the individual images for each category classified into the one class, a designated trend that occurs regardless of the category can be found easily.

The display controller 10 includes a central processing unit including a processing circuit. For example, the computer functions as the display controller 10. The memory device 20 includes, for example, at least one of a HDD or flash memory. The memory device 20 may include a network-attached hard disk (NAS). The memory device 20 may be connected to the computer functioning as the display controller 10 via a network, or may be provided inside the computer.

The input device 30 includes, for example, at least one of a keyboard, a mouse, a touchpad, or a microphone (a voice input). The display device 40 includes, for example, at least one of a monitor, a projector, or a printer. One device such as a touch panel may function as the input device 30 and the display device 40.

FIG. 3A to FIG. 5 are schematic views illustrating the processing of the analysis system according to the embodiment.

FIG. 6 shows a display example of the analysis system according to the embodiment.

Here, a specific example is described in which wafer data is analyzed using the analysis system according to the embodiment.

For example, the display controller 10 includes an acquirer 11, a formatter 12, a classification processor 13, a product type sorter 14, an image generator 15, and an image displayer 16.

The wafer is an example of a workpiece. The database stores multiple wafer data. The wafer data includes, for example, the wafer ID, the product type, the lot ID, the chip coordinates, and the inspection result. The wafer ID is information for identifying each wafer. The product type is an example of a category. The lot ID is information for identifying the lot to which the wafer belongs. The inspection result is an example of information relating to the workpiece (the wafer).

When processing the wafer, multiple chips are made from one wafer. The chip coordinates indicate the positions where the chips are made in one wafer. The product type is set according to the type of product to which the chip is applied. For example, the product type is set for each customer to which the chip or the product is delivered, or for each specification required for the chip.

For example, when two chips having mutually-different specifications are delivered to one customer, mutually-different product types are set for the two wafers in which the two chips are respectively manufactured. When two chips having the same specification are delivered to two mutually-different customers, mutually-different product types are set for the two wafers in which the two chips are respectively manufactured.

For example, after processing the wafers by using multiple equipment, a characteristic or the external appearance is inspected at multiple points of each wafer. For example, one of the inspected multiple points corresponds to the position where one of the multiple chips of the wafer is made. The inspection result at each point is stored as a value. For example, "0" is stored when the result is good; and "1" is stored when the result is not good (a failure). The inspection result is associated with the position information (the chip coordinate) of each point of the wafer.

FIG. 3A and FIG. 3B illustrate inspection results of wafers W1 and W2 classified into one of multiple product types. FIG. 3C illustrates the inspection result of a wafer W3 classified into another one of the multiple product types. In FIG. 3A to FIG. 3C, a numeral that indicates the position marks each point inside the wafers. The color of each point shows the inspection result. A darkly-colored point shows that the result of inspecting the point is a failure.

For example, as illustrated in FIG. 3D to FIG. 3F, the database stores the inspection results of the wafers as vectors. The vectors illustrated in FIG. 3D to FIG. 3F are respectively based on the inspection results illustrated in FIG. 3A to FIG. 3C.

The acquirer 11 accesses the memory device 20 and acquires the data to be analyzed. For example, the user operates the input device 30 and specifies the data to be analyzed for the display controller 10. When accepting the specifying, the acquirer 11 acquires the data. Or, the acquirer 11 may be programmed to automatically acquire the data at a designated timing. When acquiring the data, the acquirer 11 transmits the data to the formatter 12.

The formatter 12 causes the formats of the chip coordinates and the inspection result to be uniform between the data of the wafers. For example, the number of points inspected in the wafer W1 shown in FIG. 3A is different from the number of points inspected in the wafer W3 shown in FIG. 3C. Therefore, as shown in FIG. 3D and FIG. 3F, the number of dimensions of the vector representing the inspection result of the wafer W1 is different from the number of dimensions of the vector representing the inspection result of the wafer W3. For example, the formatter 12 formats the chip coordinates and the inspection result of each wafer so that the number of dimensions of the vector is the same. Thereby, regardless of the product type, each wafer can be classified into one of the multiple classes based on the chip coordinates and the inspection result.

FIG. 4A shows the chip coordinates and the inspection result of the wafer W1 shown in FIG. 3A. FIG. 4B shows the chip coordinates and the inspection result of the wafer W1 after formatting. FIG. 4C shows a vector corresponding to the inspection result of the wafer W1 after formatting. FIG. 4D shows the chip coordinates and the inspection result of the wafer W3 shown in FIG. 3C. FIG. 4E shows the chip coordinates and the inspection result of the wafer W3 after formatting. FIG. 4F shows a vector corresponding to the inspection result of the wafer W3 after formatting.

Due to the processing of the formatter 12 as shown in FIG. 4A to FIG. 4F, the chip coordinates and the inspection result of each wafer have a uniform common format. For example, the number of chip coordinates and the number of inspection results are uniform between the multiple wafer data. Thereby, the number of dimensions of the vectors representing the inspection results of the wafers is the same.

For example, an affine transformation is used to format the chip coordinates and the inspection result. The chip coordinates and the inspection result are formatted by enlarging or reducing by the affine transformation. Interpolation is performed when changing the number of chip coordinates and the number of inspection results. Linear interpolation, spline interpolation, etc., can be used as the interpolation. The formatter 12 stores the formatted data in the memory device 20. When the wafers have common chip coordinates and inspection results regardless of the product type, the formatter 12 may not format the chip coordinates and the inspection results.

Based on the formatted inspection results, the classification processor 13 classifies the data of each wafer into one of the multiple classes. A clustering technique can be used for the classification. The classification processor 13 transmits the classification result to the product type sorter 14 and the image generator 15.

When receiving the classification result from the classification processor 13, the image generator 15 generates a comprehensive image for each class. Specifically, the image generator 15 averages the inspection results at each chip coordinate for the wafer data of the multiple product types classified into one of the multiple classes. To generate the comprehensive image, the inspection results that are formatted by the formatter 12 are averaged. Based on the averaged inspection results, the image generator 15 generates the comprehensive image that represents the wafer data of the multiple product types classified into the one of the multiple classes.

When receiving the classification result from the classification processor 13, the product type sorter 14 sorts the multiple wafer data into each product type. The product type sorter 14 transmits the sorted wafer data to the image generator 15. In the case where the multiple wafer data is initially sorted into each product type in the database stored in the memory device 20, the processing by the product type sorter 14 may not be performed.

By using the classification result from the classification processor 13 and the result of the sorting by the product type sorter 14, the image generator 15 generates an individual image for each of the product types from the wafer data classified into each class. Specifically, the image generator 15 averages the inspection results for each chip coordinate for data of one or more wafers classified into one of the multiple classes and classified into one of the multiple product types. The formatted inspection result may be used to generate the individual image. It is desirable to generate the individual image by averaging the unformatted inspection result stored in the memory device 20. Thereby, the individual image can be generated based on the actual inspection results. The averaging is unnecessary when the amount of wafer data classified into one of the multiple classes and classified into one of the multiple product types is one wafer. Based on the averaged inspection results, the image generator 15 generates the individual image representing the wafer data classified into one of the multiple classes and classified into one of the multiple product types.

By repeating similar processing for each class, the image generator 15 generates the individual image for each product type. In other words, the image generator 15 generates individual images representing the wafer data classified into the one of the multiple classes and classified into the other product types. The image generator 15 generates the comprehensive image and one or more individual images for the multiple wafer data classified into one of the multiple classes, and generates another comprehensive image and another one or more individual images for the multiple wafer data classified into another one of the multiple classes.

When the amount of wafer data classified into one product type is low, there may be no wafer data classified into some class for the one product type. In such a case, an individual image is not generated for the wafer data classified into the class and classified into the one product type.

Figure 5:
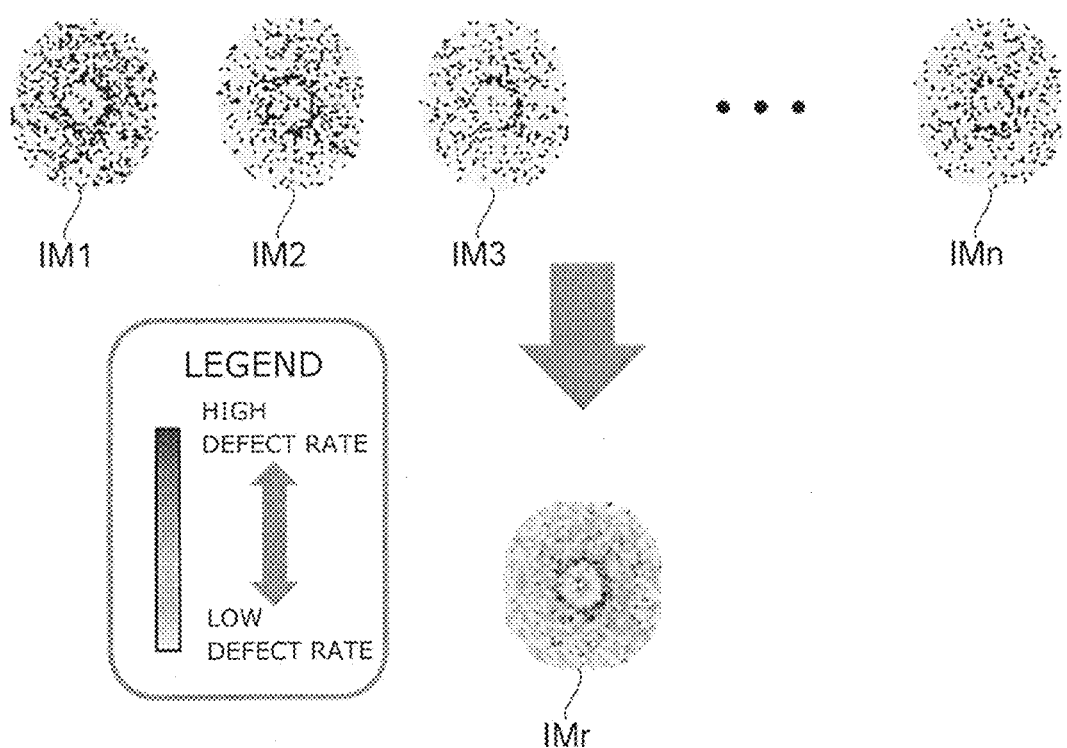

FIG. 5 illustrates typical generation processing of images. Images IM1 to IMn respectively illustrate the chip coordinates and the inspection results of multiple wafers. An image IMr illustrates the average of the inspection results of the multiple wafers. In the images IM1 to IMn, the dark points indicate where the inspection result at that point is a failure. In the image IMr, the darker-colored points indicate that more failures occurred at those points.

For example, when the images IM1 to IMn are based on wafer data classified into one of the multiple classes and classified into one of the multiple product types, the image IMr that is generated is an individual image. When the images IM1 to IMn are based on wafer data including the multiple product types classified into one of the multiple classes, the image IMr that is generated is a comprehensive image.

The image generator 15 transmits the generated multiple comprehensive images and the generated multiple individual images to the image displayer 16. The image displayer 16 causes the display device 40 to display the received images.

For example, as shown in FIG. 6, the image displayer 16 displays the individual images in a display region ui1 and displays the comprehensive images in a display region ui2. The display region ui1 and the display region ui2 are adjacent to each other. In the example of FIG. 6, the individual images and the comprehensive images are illustrated in a table.

In the table shown in FIG. 6, the comprehensive image and the individual images that are classified into one class are displayed in one row. The comprehensive images are displayed for each class in the column of the display region ui2. In each column of the display region ui1, the individual images that are classified into one product type are displayed for each class. The cells where images are not displayed show that there is no wafer data classified into that class and that product type. For example, the table of FIG. 6 shows that wafer data classified into a class 1 and classified into a product type A or C do not exist.

For example, there is technology that classifies the inspection result of multiple wafers into multiple classes for each product type. According to this technology, it is unnecessary for the user to confirm all of the inspection results of the multiple wafers when investigating the inspection results. For example, for one product type, the user confirms only a part of the multiple wafer data classified into one of the multiple classes. Thereby, the user can confirm the trend of the inspection results for the multiple wafer data classified into the one class. Because it is unnecessary to confirm all of the inspection results of the multiple wafers, the time necessary for the investigation of the inspection results by the user can be shortened.

The technology described above is useful when the number of product types is low. When the number of product types is low, all of the classification results can be confirmed easily even when the multiple wafer data are classified into multiple classes for each product type. On the other hand, it is difficult to implement the technology described above when there are many product types. When the number of product types is high, the time that is necessary to confirm all of the classification results lengthens when the multiple wafer data is classified into the multiple classes for each product type.

Common trends may appear in the inspection results of the wafers for multiple product types. If the product types having a common trend are known, it is possible to verify the cause of the inspection results from the elements common to these product types. For example, when the wafers of multiple product types having a common trend of the positions where the failures occur are processed by certain equipment, the likelihood is high that the certain equipment is a cause.

It is easy to find such a commonality when the number of product types is low. The commonality of the inspection results can be found by comparing the wafer data classified into each class for each product type. However, the amount of the data that must be compared increases as the number of product types increases. Therefore, the time that is necessary for the comparison lengthens. The likelihood that the commonality of the inspection results may be overlooked also increases.

As shown in FIG. 6, the analysis system 1 according to the embodiment can display the comprehensive image and the individual images for each class. By displaying the comprehensive image of each class, the trend of the inspection results in each class can be ascertained easily even without confirming the inspection results for each product type.

The analysis system 1 according to the embodiment formats the wafer data of multiple product types and classifies the wafer data into common classes. Thereby, as shown in FIG. 6, the analysis system 1 according to the embodiment can display the individual images of the multiple product types for each class common to the multiple product types. By displaying the individual images of the product types for each class, the trend of the inspection results common to the multiple product types can be found easily. By finding a commonality, even if the amount of wafer data is low for a product type, an investigation that relates to the inspection result is possible based on the inspection result of another product type. Even if the amount of wafer data is low for a product type, the investigation that relates to the inspection result is possible based on the inspection result of the other product type.

For example, as shown in FIG. 6, it is desirable for the image displayer 16 to display the analysis result as a table. The multiple rows correspond respectively to one of the multiple classes or the multiple product types; and the multiple columns correspond respectively to the other of the multiple classes or the multiple product types. By displaying the table including the comprehensive images and the individual images, the comparison of the comprehensive images and the individual images is easy. For example, the user easily can ascertain the trend of the inspection results occurring in the multiple product types.

For example, in the table, the comprehensive image (a first comprehensive image) that relates to one of the multiple classes and the comprehensive image (a second comprehensive image) that relates to another one of the multiple classes are displayed in one of the multiple rows or one of the multiple columns. The first comprehensive image and an individual image (a first individual image) relating to the one of the multiple classes and the one of the multiple product types are displayed in the other of the one of the multiple rows or the one of the multiple columns.

In the wafer data, one of multiple values indicating the inspection result may be assigned to the positions of one wafer that are inspected; and another value other than the multiple values may be assigned to the positions that are not inspected. For example, one wafer includes an effective region where the chips are made, and an ineffective region positioned around the effective region. "0" or "1" that indicates the inspection result is assigned to each position (each chip) in the effective region. A value other than "0" and "1" is assigned to each position in the ineffective region.

There is a possibility that the values assigned to the ineffective region may be impairment when classifying the wafer data by using the chip coordinates and the values of the wafer data. For example, as shown in FIG. 6, it is desirable to classify the wafer data into each trend of the occurrence sites of the failures. If a designated value is assigned to the ineffective region, for example, when performing clustering, there is a possibility that the boundary between the effective region and the ineffective region may be recognized as a feature more easily than the trend of the occurrence sites of the failures.

For example, when formatting the wafer data, the formatter 12 replaces the values at each position in the ineffective region into values indicating the inspection results. Thereby, it is difficult for the boundary between the effective region and the ineffective region to be recognized as a feature. The wafer data is classified more appropriately according to the trend of the occurrence sites of the failures when performing the clustering.

An example is described above in which the wafer data is classified using the chip coordinates and the inspection result of each point of a wafer. The analysis system 1 according to the embodiment also is applicable when classifying data relating to other workpieces.

For example, the memory device 20 stores multiple image data. The data of each image is classified into one of multiple categories. The data of each image includes multiple pixel coordinates and multiple pixel values. The multiple pixel values indicate the values (the colors) at the multiple pixel coordinates. For example, each workpiece that passes through a designated position is imaged from a designated location to generate the image data. The entirety or a part of the workpiece is imaged in the image data. Something (a background) other than the workpiece may be imaged in the image data. When the image data includes a background, it is desirable for the background substantially not to change between the multiple image data.

The display controller 10 classifies the data of each image into one of multiple classes by using the multiple pixel coordinates and the multiple pixel values. The image data may be formatted to cause the number of pixel coordinates and the number of pixel values included in one image data to be uniform when the number of pixel coordinates and the number of pixel values are different between the multiple image data. After classifying the data of each image into one of the classes, similarly to the example described above, the display controller 10 generates the comprehensive image and the individual images for each class.

For example, when there is a failure in the external appearance of the workpiece, the image data is classified according to the shape, the color, the location, etc., of the site where the failure occurs. For example, the user easily can find the failure of the external appearance occurring in workpieces of multiple categories by comparing the comprehensive image and the individual images.

The embodiments may include the following configurations.

Configuration 1

An analysis method displaying a first comprehensive image and a first individual image from a plurality of workpiece data, the plurality of workpiece data relating to a plurality of workpieces, being classified into a plurality of categories, and being classified into one of a plurality of classes, the first comprehensive image being based on the plurality of workpiece data, the first individual image being based on a part of the plurality of workpiece data classified into one of the plurality of categories.

Configuration 2

A storage medium storing a program, the program causing a processing device to display a first comprehensive image and a first individual image from a plurality of workpiece data, the plurality of workpiece data relating to a plurality of workpieces, being classified into a plurality of categories, and being classified into one of a plurality of classes, the first comprehensive image being based on the plurality of workpiece data, the first individual image being based on a part of the plurality of workpiece data classified into one of the plurality of categories.

According to the embodiments described above, an analysis system, an analysis method, a program, and a storage medium can be provided in which information that is more beneficial to a user can be provided.

For example, the processing of the various data recited above is performed based on a program (software). For example, the processing of the various information recited above is performed by a computer storing the program and reading the program.

The processing of the various information recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the information that is recorded in the recording medium can be read by a computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

At least a part of the processing of the information recited above may be performed by various software operating on a computer (or an embedded system) based on a program installed in the computer from a recording medium. The software includes, for example, an OS (operating system), etc. The software may include, for example, middleware operating on a network, etc.

The recording medium according to the embodiments stores a program that can cause a computer to execute the processing of the various information recited above. The recording medium according to the embodiments also includes a recording medium to which a program is downloaded and stored using a LAN, the Internet, etc. The processing recited above may be performed based on multiple recording media.

The computer according to the embodiments includes one or multiple devices (e.g., personal computers, etc.). The one or multiple devices function as a display controller. The computer according to the embodiments may include multiple devices connected by a network. The multiple devices that are connected via the network may function as a display controller.

Hereinabove, exemplary embodiments of the invention are described with reference to specific examples. However, the embodiments of the invention are not limited to these specific examples. For example, one skilled in the art may similarly practice the invention by appropriately selecting specific configurations of components such as display controllers, memory devices, input devices, display devices, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all analysis systems, analysis methods, programs, and storage media practicable by an appropriate design modification by one skilled in the art based on the analysis systems, the analysis methods, the programs, and the storage media described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such embodiments or modifications as would fall within the scope and spirit of the invention.

What is claimed is:

1. An analysis system, comprising a display controller configured to display a first comprehensive image and a first individual image from a plurality of workpiece data, the plurality of workpiece data relating to a plurality of workpieces, being classified into a plurality of categories, and being classified into one of a plurality of classes the first individual image showing a plurality of chip coordinates and a plurality of inspection results at the plurality of chip coordinates, the plurality of inspection results being calculated by averaging a part of the plurality of workpiece data classified into one of the plurality of categories, the first comprehensive image showing another plurality of chip coordinates and another plurality of inspection results at the other plurality of chip coordinates, the other plurality of inspection results being calculated by averaging the plurality of workpiece data.

2. The system according to claim 1, wherein the display controller is further configured to display a second individual image based on another part of the plurality of data classified into another one of the plurality of categories.

3. The system according to claim 1, wherein the display controller is further configured to display a second comprehensive image and a third individual image from another plurality of workpiece data, the other plurality of workpiece data being classified into the plurality of categories and classified into another one of the plurality of classes, the second comprehensive image being based on a second average data generated by averaging the other plurality of workpiece data, the third individual image being based on a part of the other plurality of data classified into the one of the plurality of categories.

4. The system according to claim 1, wherein the display controller is configured to
refer to a database, the database storing the plurality of workpiece data, the workpiece data including a workpiece ID identifying the workpiece, and a value for each point of the workpiece, and
classify each of the plurality of the workpiece data into one of the plurality of classes by using a plurality of the values.

5. The system according to claim 4, wherein
the display controller is configured to display a table including the first comprehensive image and the first individual image, and
the first comprehensive image and the first individual image are displayed in one of a plurality of rows or one of a plurality of columns of the table.

6. The system according to claim 4, wherein the display controller is further configured to display a second comprehensive image based on a second average data generated by averaging the workpiece data classified into another one of the plurality of classes.

7. The system according to claim 4, wherein
the display controller
formats the plurality of workpiece data to cause a number of the plurality of values included in each of the plurality of workpiece data to be uniform between the plurality of workpiece data, and
classifies each of the plurality of workpiece data into one of the plurality of classes by using the formatted plurality of values.

8. The system according to claim 7, wherein the display controller generates the first comprehensive image by using the formatted plurality of values, and generates the first individual image by using the plurality of values before the formatting.

9. The system according to claim 4, wherein
for each of the plurality of workpiece data, a part of the plurality of values corresponds to a first region of the workpiece, and another part of the plurality of values corresponds to a second region of the workpiece, and
when the part of the plurality of values includes a first value and a second value, and the other part of the plurality of values includes only a third value, the display controller replaces the third value with the first value or the second value for each of the plurality of workpiece data.

10. The system according to claim 1, wherein
the plurality of workpiece data are a plurality of images, and
the display controller is configured to display the first comprehensive image and the first individual image based on the plurality of images.

11. The system according to claim 1, wherein
the plurality of workpieces are a plurality of wafers, the plurality of workpiece data include a plurality of inspection results of the plurality of wafers, and
the display controller configured to classify the plurality of workpiece data based on the plurality of inspection results.

12. The system according to claim 11, wherein
the display controller configured to
   create the first comprehensive image based on the plurality of inspection results, and
   create the first individual image based on the plurality of inspection results of the part of the plurality of workpiece data classified into the one of the plurality of categories.

* * * * *

UNITED STATES PATENT AND TRADEMARK OFFICE
CERTIFICATE OF CORRECTION

PATENT NO. : 10,976,264 B2
APPLICATION NO. : 16/564078
DATED : April 13, 2021
INVENTOR(S) : Shun Hirao Page 1 of 1

It is certified that error appears in the above-identified patent and that said Letters Patent is hereby corrected as shown below:

On the Title Page

Item (73), after "Assignee: KABUSHIKI KAISHA TOSHIBA, Tokyo, (JP)," insert --; TOSHIBA ELECTRONIC DEVICES & STORAGE CORPORATION, Tokyo (JP)--.

In the Claims

Claim 1, Column 9, Line 55, "plurality of classes the first" should read --plurality of classes, the first--.

Signed and Sealed this
Fourteenth Day of November, 2023

Katherine Kelly Vidal
*Director of the United States Patent and Trademark Office*